Jan. 17, 1961 C. W. DICKEY 2,968,584
GLASS TUBE CLEANING
Filed Oct. 31, 1956
2 Sheets-Sheet 1

INVENTOR.
CLYDE W. DICKEY
BY Clarence R. Patty Jr.
ATTORNEY

Jan. 17, 1961     C. W. DICKEY     2,968,584
GLASS TUBE CLEANING
Filed Oct. 31, 1956     2 Sheets-Sheet 2
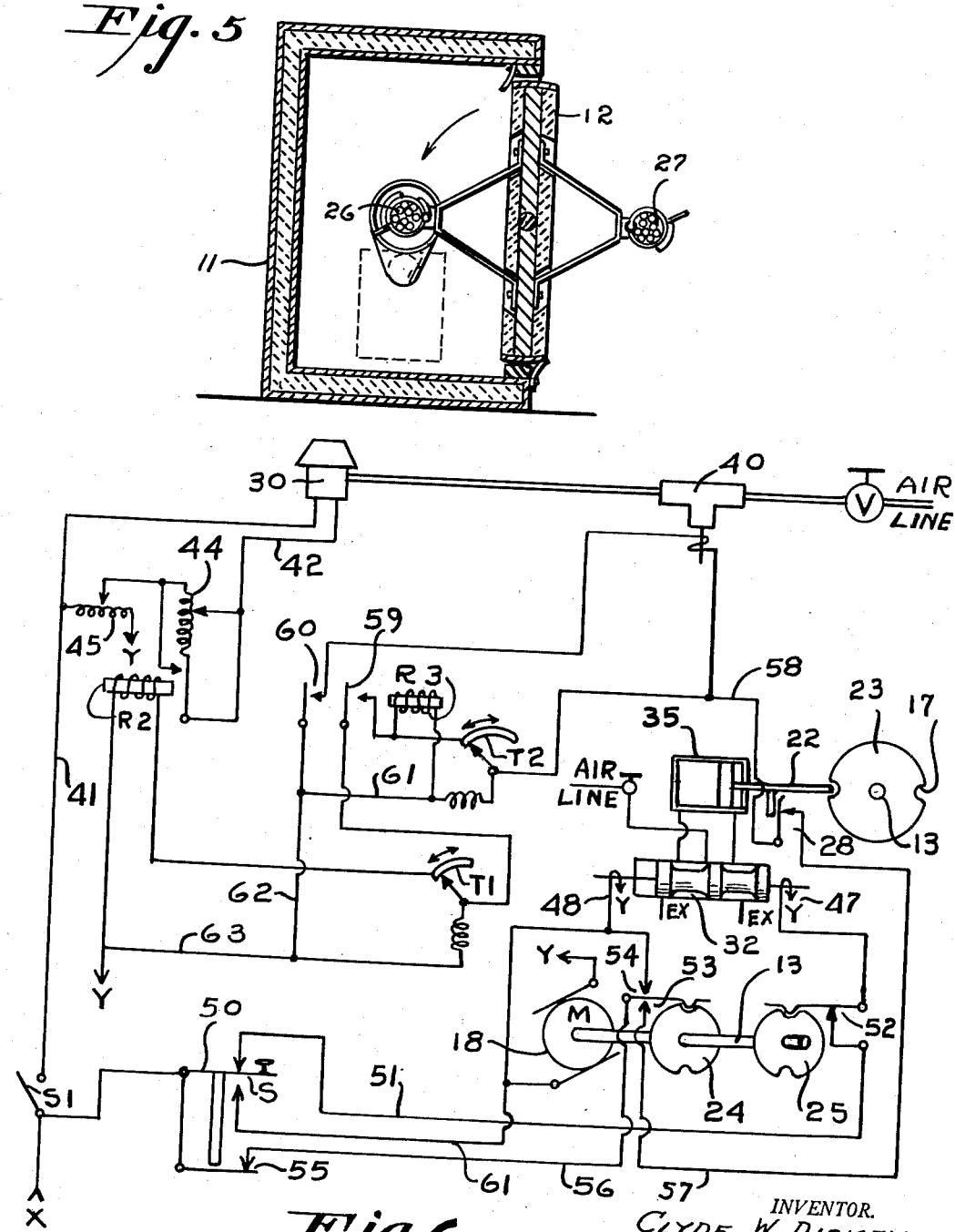

2,968,584
GLASS TUBE CLEANING

Clyde W. Dickey, Elmira, N.Y., assignor to Corning Glass Works, Corning, N.Y., a corporation of New York Filed Oct. 31, 1956, Ser. No. 619,514

3 Claims. (Cl. 134—1)

The present invention relates to article cleaning, but is concerned particularly with the removal of fine glass particles, lint and the like from glassware surfaces, as for example from the surfaces and from the interior of glass tubes.

Glass tubing is conventionally produced in great quantity by continuous draw methods having associated facilities for automatically separating the tubing into tubes of a desired length upon its arrival at a delivery position. During the separating operation and subsequent handling, foreign matter enters the tubes so that by the time that they are to be used in the manufacture of pharmaceutical ware it is essential that they be thoroughly cleaned. In the past the cleaning has been effected by the use of liquid cleaners, but at best these are messy and are to be avoided if possible.

According to the invention high intensity ultrasonic sound energy in air is used to dislodge fine glass, lint, and other adhered particles from article surfaces while streams of such air are employed to remove such matter from association therewith. The method, as applied to the cleaning of tubular bodies, comprises coupling the ultrasonic sound energy to a bundle of tubes positioned in the sound field to dissipate such energy along the walls of the tubes, and in so doing dislodging the particles. The particles are carried out of and/or away from the tubes by the flow of air from the transducer supply and partial rectification of the acoustic wave due to finite amplitude distortion. Conveniently, a structure suitable for carrying out applicant's method may comprise an enclosure having a revolving door provided with a support on either side thereof for a bundle of tubes.

With the door closed the support within the enclosure is in position to align a bundle of tubes within the sound and air path conveniently provided by a suitable transducer having a horn adapted to direct sound energy into an air stream directed through the respective tubes of a bundle, while the remaining support is available for unloading of a cleaned bundle of tubes and for loading the same with another bundle.

To provide for automatic control and timing of a cleaning cycle, and to suitably guard against damage to equipment and hazard to an operator, suitably interlocked circuits are provided. To this end the door is locked in its closed position during a cleaning cycle whose length is determined by a suitable timing device. A timing device is also provided for varying the siren speed and energy output to enhance its cleaning action.

Also, to protect the siren against possible damage, means is provided for supplying air to the siren only after its operation has been initiated. Initiation of cleaning cycles are effected by operating a start button. When a cleaning cycle has been completed the door is automatically unlocked. By pressing the start button the door is then turned one half revolution to transpose the positions of the tube supports, is relocked, and a further cleaning cycle initiated. Rotation of the door is by means of a motor equipped with a built-in brake. For a more detailed description of the invention reference is made to the accompanying drawings:

Fig. 5 is a sectional elevation taken on line 5—5 of Fig. 1.

Fig. 6 is a wiring diagram.

Figure 1:
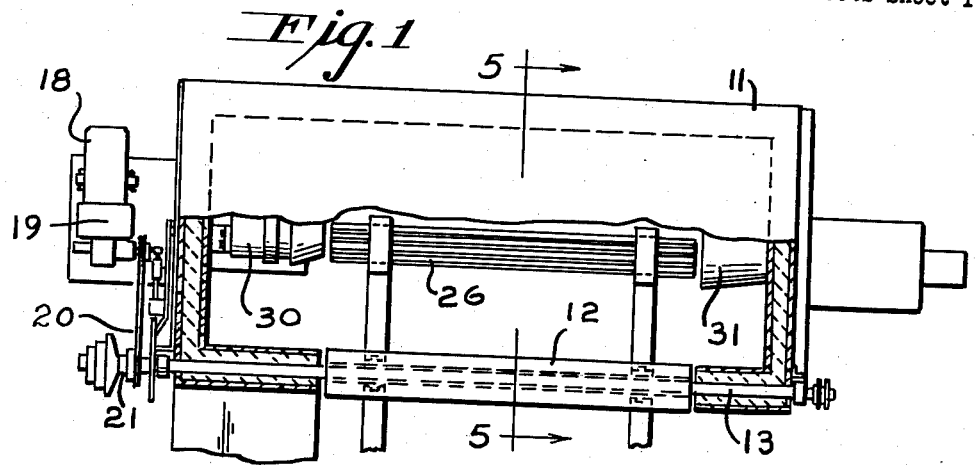
Fig. 1 is a top plan view of the equipment, with the housing partly broken away to show the interior thereof and a bundle of tubes supported therein from a door thereof.
Figure 2:
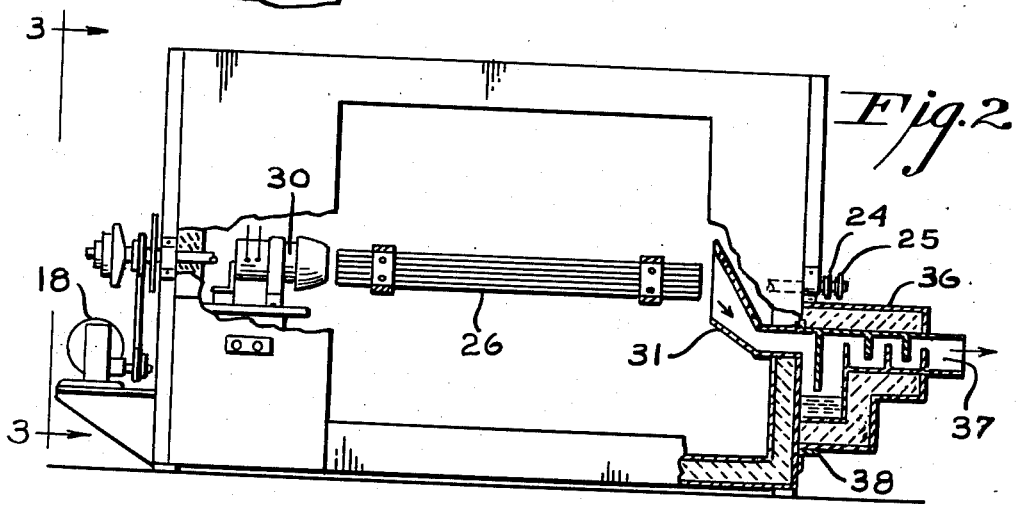
Fig. 2 is a front elevational view of the equipment, partly in section, with a bundle of tubes shown in the position within the housing in which it is supported from the interior of the door.
Figure 3:
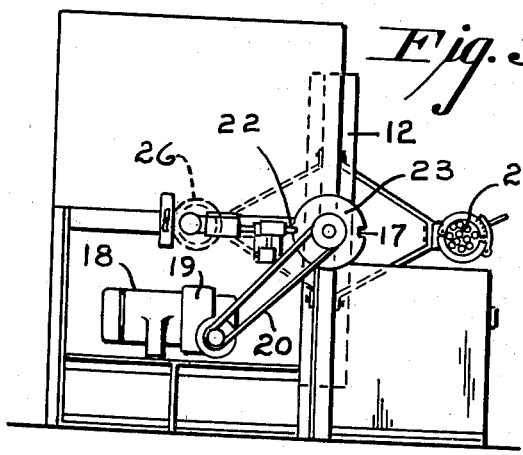
Fig. 3 is an end view of the equipment.
Figure 4:
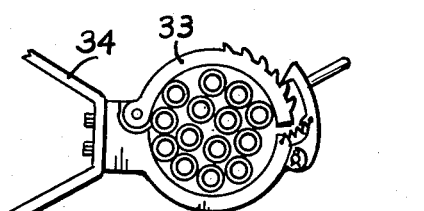
Fig. 4 is an enlarged fragmentary view illustrating the specific manner of holding a bundle of tubes to be operated upon.

Referring to the drawings in detail, a sound insulated housing 11 is provided with a door 12 carried on a horizontal shaft 13. Shaft 13 is adapted to be turned by means of a motor 18 through the medium of an associated speed reduction gear 19, a belt 20, and a slip clutch 21, whenever a pin 22 (Fig. 6) is withdrawn from the associated two notches, such as 17 in two opposite edges of a disc 23 keyed to shaft 13. The opposite end of shaft 13 is provided with operating circuit control cams 24 and 25 whose functions will be brought out hereinafter. The pin 22 is normally held in a notch 17 in disc 23 by an air cylinder 35 which has air supplied to it via a magnetic control valve 32. As is obvious, the notches in disc 23 are cooperative with pin 22 to facilitate locking of the shaft 13 to hold the door 12 closed with one or the other of two bundles of glass tubes 26 and 27 within the housing 11 aligned lengthwise between the output end of a transducer comprising a siren 30 and a foreign matter receiving funnel 31. Each end of a bundle of tubes is clasped in a suitable carrier such as 33 attached to door 12 by brackets such as 34. Air is supplied to siren 30 through suitable manually operable and magnetic valves V and 40, Fig. 6.

Arranged exterior to the housing 11, in communication with the funnel 31, is an auxiliary housing 36 providing a suitably baffled air exhaust passage 37 which includes a basin containing liquid 38 over which the air laden with foreign matter must pass and which receives the most of such matter. The magnetic valve 40, which controls the flow of air to the siren 30, is under the joint control of a timing device T2 and a relay R3. The timing device T2 measures the elapsed time of a cleaning cycle. A second timing device T1 jointly with a relay R2 determines the elapsed time during which the siren 30 is to operate at high speed.

To place the system into operation power is applied thereto by the closure of a switch S1 which closes an operating circuit for the siren 30 that extends from an X terminal of a suitable current source, over conductor 41 to one terminal of the siren. The other terminal of the siren is connected to a Y terminal of the same current source via a conductor 42, a rheostat 44 and an autotransformer 45. The siren accordingly initially operates at a low speed determined by the setting of the rheostat, and the autotransformer. The manually operable valve V may now be opened to place the supplying of air to the siren under control of the magnetic valve 40.

Assuming that the door 12 is closed, the switch S1 completes an operating circuit for a control magnet 47 of valve 32 to assure that its slide is in a position to feed air to the left end of the door lock air cylinder 35, and completes operating circuits for the relay R3 and timer T2 to put the apparatus through a cleaning cycle.

The circuit for magnet 47 extends from an X terminal of a suitable current source, through the switch S1, a switch S spring 50 and its resting contact, a conductor 51, the contacts 52 of cam 25 and the magnet 47 to a Y terminal of the same current source. The circuits through relay R3 and the timer T2 extend via the break contacts 55 of switch S, a conductor 56, the break contacts 53 of cam 24, conductor 57, door lock contacts 28, a conductor 58, to a common terminal of the winding of timer T2 and its wiper whose fixed contact is connected to one terminal of the relay R3. The opposite terminals of the R3 and T2 windings are connected to a Y terminal of the current source via conductors 61, 62, and 63.

Relay R3 upon operating, at its contacts 59 directly completes the obvious operating circuit of timer T1, and via the wiper and contact of timer T1 also completes the circuit of relay R2, which is connected in parallel with T1. Relay R3 also, at its contacts 60 completes the operating circuit of the magnet of valve 40 by bridging it across conductors 58 and 63. The relay R2 accordingly operates and shunts the rheostat 44 from the siren operating circuit permitting it to operate at full speed. At the same time valve 40 operates to supply air to the siren providing of course that the manually operable valve V has been opened.

After the lapse of a predetermined set time, 10 seconds for example, the wiper of timer T1 passes off its fixed contact and thus interrupts the circuit of relay R2 which de-energizes and again cuts the rheostat 44 into the siren circuit. After a further predetermined time lapse, considered necessary to adequately clean the tubes, for example 15 seconds, the wiper of timer T2 runs off its fixed contact and thus interrupts the circuit of relay R3 which de-energizes and opens the circuits of the magnet of valve 40 and of the timer T1 permitting them to restore and thus terminate the cleaning cycle, while permitting the siren to run at low speed and with the valve 40 closed between cleaning cycles.

To turn the door 12 one half revolution as required to introduce another bundle of tubes into the chamber and to clean the tubes of such bundle the operator simply depresses switch S, which, at its contacts 55 breaks the circuit of magnet 47 and at its spring 50 and its front contact closes an operating circuit for the magnet 48 of the control valve 32 via conductor 61 to reverse the air connections to cylinder 35 and thus unlock the door. The switch S at the same time at spring 50 and its front contact closes a circuit through the door motor 18. As soon as the door has turned a short distance the break contacts 52 of cam 25 open, thereby preventing magnet 47 from again becoming energized to lock it until the door has been turned to a fully closed position. At substantially the same time the make contacts 54 of cam 24 close to establish an alternative operating circuit for motor 18 via contacts 55 as the operator releases the switch S, and accordingly rotation of shaft 13 is continued until the door 12 is closed.

As will be noted when the cylinder 35 is activated to unlock the door 12 and contacts 28 open and enable the timer T2 to restore to its initial position.

As soon as the door 12 is again closed the circuit of motor 18 is interrupted by the opening of contacts 54 of cam 24 and such motor, being of the built-in brake type, stops instantly. At the same time however that the motor circuit is interrupted the contacts 52 of cam 25 close to re-establish the previously traced circuit of magnet 47 to effect reversal of the air connections to cylinder 35 to effect locking of the door 12. As locking of the door is effected contacts 28 close to again initiate a cleaning cycle.

What is claimed is:

1. The method of cleaning a tubular body which comprises enclosing the same in a sound proof chamber, and directing a stream of air through the bore and along the outer surface of such body while subjecting such body to high intensity sound.

2. The method of cleaning tubular bodies which comprises arranging a plurality of such bodies in parallel relationship in a bundle, concurrently directing streams of air through the bores of such bodies and along their outer surfaces, generating high intensity sound in such streams of air to dislodge adhered particles from the surfaces of such bodies and to sweep such particles from association therewith while automatically varying the intensity of sound in such streams to enhance their cleaning action.

3. A tubular body cleaning system which comprises a sound insulated housing, a tubular body support within said housing, a transducer arranged to direct high intensity sound in air through and along the exterior surface of a supported tubular body to dislodge particles from its surfaces, means for rapidly moving such air through the bore of such body to remove the dislodged particles therefrom and means for periodically automatically modifying the intensity of sound produced by said transducer to enhance its effectiveness.

References Cited in the file of this patent

UNITED STATES PATENTS

| | | |
|---|---|---|
| 682,156 | Clough | Sept. 3, 1901 |
| 932,802 | Morrill | Aug. 31, 1909 |
| 1,009,294 | Fishburn | Nov. 21, 1911 |
| 1,738,565 | Claypoole | Dec. 10, 1929 |
| 2,366,822 | Willard | Jan. 9, 1945 |
| 2,468,550 | Fruth | Apr. 26, 1949 |
| 2,647,846 | Bagno | Aug. 4, 1953 |
| 2,657,021 | Cottell | Oct. 27, 1953 |
| 2,748,585 | Sisson | June 5, 1956 |
| 2,769,506 | Abboud | Nov. 6, 1956 |
| 2,814,575 | Lange | Nov. 26, 1957 |
| 2,828,231 | Henry | Mar. 25, 1958 |

FOREIGN PATENTS

| | | |
|---|---|---|
| 1,037,310 | France | Apr. 29, 1953 |
| 1,076,035 | France | Apr. 14, 1954 |